United States Patent
Perez-Rovira et al.

(10) Patent No.: US 12,293,599 B2
(45) Date of Patent: May 6, 2025

(54) METHODS AND SYSTEMS FOR DETERMINING AUTHENTICITY OF A DOCUMENT

(71) Applicant: Daon Technology, Dublin (IE)

(72) Inventors: Adria Perez-Rovira, Barcelona (ES); Nicolas Jacques Jean Sezille, Dublin (IE)

(73) Assignee: Daon Technology, Douglas (IM)

(*) Notice: Subject to any disclaimer, the term of this patent is extended or adjusted under 35 U.S.C. 154(b) by 560 days.

(21) Appl. No.: 17/572,721

(22) Filed: Jan. 11, 2022

(65) Prior Publication Data
US 2023/0222826 A1 Jul. 13, 2023

(51) Int. Cl.
*G06V 30/413* (2022.01)
*G06V 10/46* (2022.01)
*G06V 10/74* (2022.01)
*G06V 10/774* (2022.01)
*G06V 30/412* (2022.01)

(52) U.S. Cl.
CPC .......... *G06V 30/413* (2022.01); *G06V 10/467* (2022.01); *G06V 10/761* (2022.01); *G06V 10/774* (2022.01); *G06V 30/412* (2022.01)

(58) Field of Classification Search
CPC .... G06V 30/40; G06V 30/413; G06V 10/467; G06V 10/469; G06V 10/761; G06V 30/412; G06V 10/774; G06V 10/462; G06V 10/77; G06V 10/7715; G06V 10/776; G06V 30/41; G06V 30/418; G06V 30/42; G06V 30/1823
See application file for complete search history.

(56) References Cited

U.S. PATENT DOCUMENTS

2009/0154778 A1* 6/2009 Lei ................. G06V 30/413
                                                         382/112
2013/0015946 A1* 1/2013 Lau ................. G06V 40/172
                                                          340/5.2
(Continued)

FOREIGN PATENT DOCUMENTS

EP           0 718 808 A2    6/1996

OTHER PUBLICATIONS

Extended European Search Report for EPO Application No. 22215551.7, dated Jun. 14, 2023, pp. 1-12.

*Primary Examiner* — Oneal R Mistry
*Assistant Examiner* — Duy Tran
(74) *Attorney, Agent, or Firm* — Kevin McDermott, Esq.

(57) ABSTRACT

A method for determining authenticity of a document is provided that includes receiving, by an electronic device, an image of a document, assigning a label to the image, and obtaining vectors for each image in a subset of images. Each image is of a document and is assigned the same label as the received image. Moreover, the method includes encoding the received image into a vector, calculating a distance between the vector of the received image and each obtained vector, comparing each of the calculated distances against a threshold distance, and calculating a number of the calculated distances that are less than or equal to the threshold distance. In response to determining the calculated number is at least equal to a required number, the document in the received image is determined to be authentic. Otherwise, the received image requires manual review.

15 Claims, 3 Drawing Sheets

(56) References Cited

U.S. PATENT DOCUMENTS

| | | | |
|---|---|---|---|
| 2013/0294697 A1* | 11/2013 | Nepomniachtchi | G06Q 20/10 382/192 |
| 2015/0170004 A1* | 6/2015 | Song | G06F 18/2113 382/218 |
| 2015/0341370 A1* | 11/2015 | Khan | H04L 63/20 726/30 |
| 2016/0196472 A1* | 7/2016 | Duerksen | G06V 30/224 382/145 |
| 2017/0132866 A1* | 5/2017 | Kuklinski | G07D 7/2083 |
| 2019/0180086 A1 | 6/2019 | Zhang | |
| 2019/0213408 A1* | 7/2019 | Cali | G06V 30/414 |
| 2021/0124919 A1* | 4/2021 | Balakrishnan | B42D 25/309 |

* cited by examiner

METHODS AND SYSTEMS FOR DETERMINING AUTHENTICITY OF A DOCUMENT

BACKGROUND OF THE INVENTION

This invention relates generally to authenticating documents, and more particularly, to methods and systems for determining authenticity of a document.

Airline passengers are required to provide documents like passports and flight passes before boarding a flight. The documents are reviewed and if deemed authentic passengers are permitted to board their flights. Many countries have implemented travel restrictions due to the COVID 19 pandemic. The restrictions require each passenger to provide additional documents for review prior to permitting passengers to board their flights. Additional documents related to COVID 19 restrictions typically include a proof of vaccination or an antigen/PCR negative laboratory test result.

Currently, passengers are required to upload pictures of the documents as proof of compliance with travel restrictions. The uploaded pictures are manually reviewed to detect fraudulent documents. Each document in a picture is reviewed to determine whether or not it is an authentic document issued by an entity authorized to issue such documents. Example entities include, for example, hospitals, laboratories, clinics, and governmental agencies.

Because millions of people desire to travel, millions of documents need to be manually reviewed for authenticity. Manually reviewing such a large number of documents is slow, inefficient, not scalable, and exceptionally expensive. It is known that sometimes documents are not properly or timely processed which results in delays that are inconvenient and frustrating for travelers.

Thus, it would be advantageous and an improvement over the relevant technology to provide a method, a computer, and a computer-readable recording medium capable of increasing the speed, efficiency, and scalability of document review while reducing costs and enhancing customer convenience and satisfaction.

BRIEF DESCRIPTION OF THE INVENTION

An aspect of the present disclosure provides a method for determining authenticity of a document including the steps of receiving, by an electronic device, an image of a document, assigning a label to the received image, and obtaining a low dimensionality vector for each image in a subset of images. Each image is of a document and is assigned the same label as the received image. Moreover, the method includes the steps of encoding the received image into a low dimensionality vector, calculating a distance between the low dimensionality vector of the received image and each obtained low dimensionality vector, comparing each of the calculated distances against a threshold distance, and calculating a number of the calculated distances that are less than or equal to the threshold distance.

In response to determining the calculated number is at least equal to a required number, the method includes determining the document in the received image is authentic. In response to determining the calculated number is less than the required number, the method includes determining the received image requires manual review.

In an embodiment of the present disclosure, the label for each image is determined based on the text of the document included in the respective image.

In another embodiment of the present disclosure the step of determining the received image requires manual review includes determining the document in the received image is not similar in content and appearance as the document in any image in the database.

In yet another embodiment of the present disclosure the step of determining the document in the received image is authentic includes determining the document in the received image is similar in content and appearance as the document in a required number of images in the database.

In another embodiment of the present disclosure the method includes the step of encoding each image in the image database into a low dimensionality vector.

Another aspect of the present disclosure provides a non-transitory computer-readable recording medium in an electronic device for determining authenticity of a document. The non-transitory computer-readable recording medium stores one or more programs which when executed by a hardware processor performs the steps of the methods described above.

Yet another aspect of the present disclosure provides an electronic device for determining authenticity of a document including a processor and a memory configured to store data. The electronic device is associated with a network and the memory is in communication with the processor. The memory has instructions stored thereon which, when read and executed by the processor, cause the electronic device to receive an image of a document, assign a label to the received image, and obtain a low dimensionality vector for each image in a subset of images. Each image is an image of a document and is assigned the same label as the received image.

Moreover, the instructions when read and executed by the processor, cause the electronic device to encode the received image into a low dimensionality vector, calculate a distance between the low dimensionality vector of the received image and each obtained low dimensionality vector, compare each of the calculated distances against a threshold distance, and calculate a number of the calculated distances that are less than or equal to the threshold distance. In response to determining the calculated number is at least equal to a required number, the document in the received image is determined to be authentic, and in response to determining the calculated number is less than the required number, the received image is determined to require manual review.

In an embodiment of the present disclosure, the instructions when read and executed by the processor, further cause the electronic device to determine the label for each image based on the text of the document included in the respective image.

In another embodiment of the present disclosure, the instructions when read and executed by the processor, further cause the electronic device to determine the document in the received image is not similar in content and appearance as the document in any image in the database when manual review is required.

In yet another embodiment of the present disclosure, the instructions when read and executed by the processor, further cause the electronic device to determine the document in the received image is similar in content and appearance as the document in a required number of images in the database when the document in the received image is determined to be authentic.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
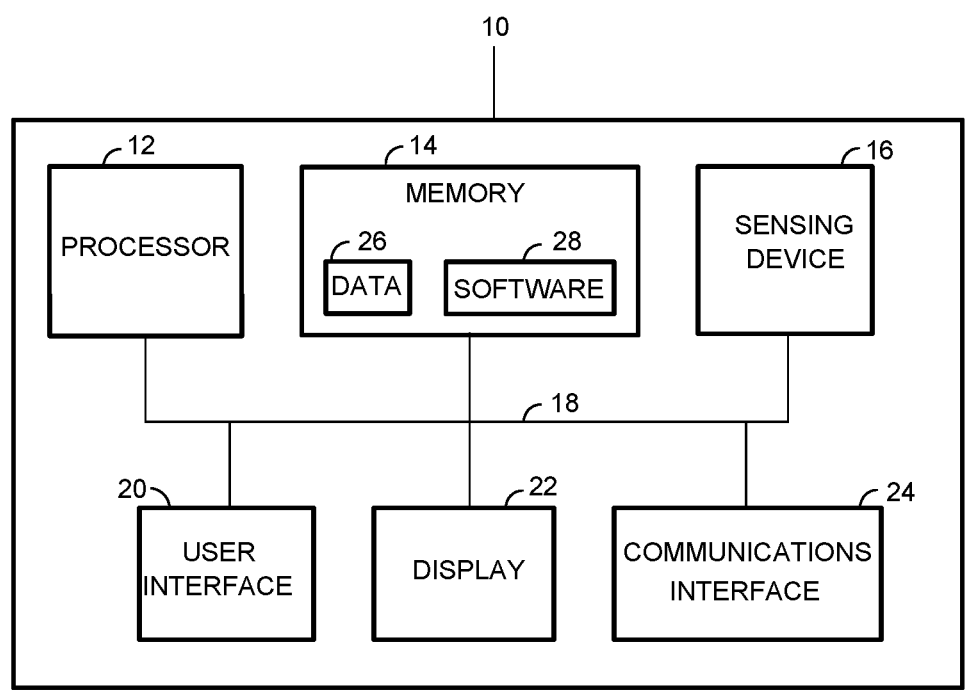
FIG. 1 is a schematic diagram of an example electronic device for determining authenticity of a document according to an embodiment of the present disclosure.

FIG. 1 is a detailed schematic diagram illustrating an example electronic device 10 for determining authenticity of a document according to an embodiment of the present disclosure. The electronic device 10 includes components such as, but not limited to, one or more processors 12, a memory 14, a sensing device 16, a bus 18, a user interface 20, a display 22, and a communications interface 24. General communication between the components in the electronic device 10 is provided via the bus 18.

The electronic device 10 can be any electronic device capable of at least downloading applications over the Internet, running applications, capturing and storing data temporarily and/or permanently, and otherwise performing any and all functions described herein by any computer, computer system, server or electronic device. The electronic device 10 may be any type of server or computer implemented as a network server or network computer. Other examples include, but are not limited to, a cellular phone, any wireless hand-held consumer electronic device, a smart phone, a tablet computer, a phablet computer, a laptop computer, and a personal computer (PC).

The processor 12 executes software instructions, or computer programs, stored in the memory 14. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 14 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMS, any type of physical and/or virtual storage, or any other digital source such as a network or the Internet from which computer programs, applications or executable instructions can be read.

The memory 14 may be used to store any type of data 26, for example, data records of users and a database of images in which each image is of a document that was previously manually reviewed and approved as authentic. The images may be stored as subsets of images of the database where the subsets are defined based on the similarity of text content between the images in the database. Each data record is typically for a respective user. The data record for each user may include data such as, but not limited to, the user's name, personal data, images of documents associated with the user, and low dimensionality (LD) vectors calculated for each image. Documents include, but are not limited to, test results for pathogens and vaccination cards. Pathogens include, but are not limited to, COVID-19. The documents include text.

LD vectors are vectors with a small number of elements. A small number of elements may be less than twenty (20) or thirty (30) elements. However, the number that constitutes small is subjective and varies. For example, a 256×256 color image can be represented as a vector with 196,608 elements. The elements can be converted into a vector having a smaller number of elements, for example, sixteen (16) elements. Alternatively, the vector elements of a 256×256 image may be converted into any number of elements that facilitates enhancing document identification a described herein such as, but not limited to, 8 and 32. A small number of elements may be within the range of about 8 to 64 elements.

LD vectors enable determining the similarity in appearance between two images. The LD vector of one image can be compared against the LD vector of other images. For each comparison, a difference in the LD vectors can be calculated. The difference between the LD vectors is a measure of the similarity in appearance of the images being compared. The smaller the difference between LD vectors, the greater the similarity in visual appearance between two images being compared. The difference between the vectors is also the distance between the vectors.

The difference, or distance, between the LD vectors of two different images can be computed as a Euclidian distance, a cosine distance, or any other type of distance that facilitates calculating the similarity between images as described herein. Alternatively, the similarity between images may be determined by using the inverse of the distance. For example, the greater the inverse of the distance the greater the similarity between images, and the smaller the inverse of the distance the smaller the similarity between images.

The term "personal data" as used herein includes any demographic information regarding a user as well as contact information pertinent to the user. Such demographic information includes, but is not limited to, a user's name, age, date of birth, street address, email address, citizenship, marital status, and contact information. Contact information can include devices and methods for contacting the user.

Additionally, the memory 14 can be used to store any type of software 28. As used herein, the term "software" is intended to encompass an executable computer program that exists permanently or temporarily on any non-transitory computer-readable recordable medium that causes the electronic device 10 to perform at least a portion of the functions, methods, and/or algorithms described herein. Application programs are software and include, but are not limited to, operating systems, Internet browser applications, machine learning algorithms (MLA), machine learning models, clustering software, optical recognition software and any other software and/or any type of instructions associated with algorithms, processes, or operations for controlling the general functions and operations of the electronic device 10. The software may also include computer programs that implement buffers and use RAM to store temporary data.

Machine learning models have parameters that are modified during training to optimize functionality of the models trained using a machine learning algorithm (MLA). A machine learning model for verifying the authenticity of documents in images may be trained using a machine learning algorithm (MLA). Such machine learning models include, but are not limited to, Siamese Neural Networks, Time Delay Neural Networks and Residual Networks.

The user interface 20 and the display 22 allow interaction between a user and the electronic device 10. The display 22 may include a visual display or monitor that displays information. For example, the display 22 may be a Liquid Crystal Display (LCD), an active matrix display, plasma display, or cathode ray tube (CRT). The user interface 20 may include a keypad, a camera, a keyboard, a mouse, an illuminator, a signal emitter, a microphone, and/or speakers.

Moreover, the user interface 20 and the display 22 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 20 communicates this change to the processor 12, and settings can be changed or user entered information can be captured and stored in the memory 14.

The sensing device 16 may include Radio Frequency Identification (RFID) components or systems for receiving information from other devices (not shown) and for transmitting information to other devices. The sensing device 16 may alternatively, or additionally, include components with Bluetooth, Near Field Communication (NFC), infrared, or other similar capabilities. Communications between the electronic device 10 and other devices (not shown) may occur via NFC, RFID, Bluetooth or the like only so a network connection from the electronic device 10 is unnecessary.

The communications interface 24 may include various network cards, and circuitry implemented in software and/or hardware to enable wired and/or wireless communications with other devices (not shown). Communications include, for example, conducting cellular telephone calls and accessing the Internet over a network. By way of example, the communications interface 24 may be a digital subscriber line (DSL) card or modem, an integrated services digital network (ISDN) card, a cable modem, or a telephone modem to provide a data communication connection to a corresponding type of telephone line. As another example, the communications interface 24 may be a local area network (LAN) card (e.g., for Ethernet™ or an Asynchronous Transfer Model (ATM) network) to provide a data communication connection to a compatible LAN. As yet another example, the communications interface 24 may be a wire or a cable connecting the electronic device 10 with a LAN, or with accessories such as, but not limited to, other electronic devices. Further, the communications interface 24 may include peripheral interface devices, such as a Universal Serial Bus (USB) interface, a PCMCIA (Personal Computer Memory Card International Association) interface, and the like.

The communications interface 24 also allows the exchange of information across a network between the electronic device 10 and any other device (not shown). The exchange of information may involve the transmission of radio frequency (RF) signals through an antenna (not shown).

Figure 2:
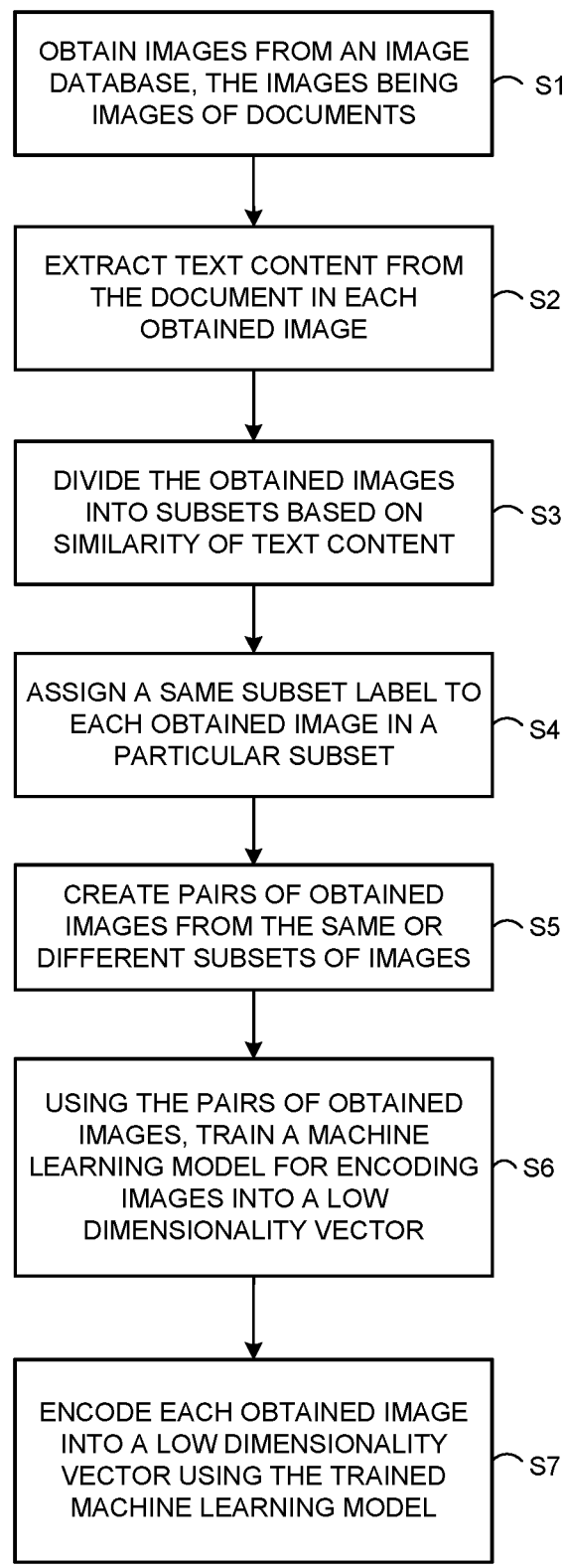
FIG. 2 is a flowchart illustrating an example method and algorithm for training a machine learning model for determining authenticity of a document according to an embodiment of the present disclosure.

FIG. 2 is a flowchart illustrating an example method and algorithm for training a machine learning model for use in determining the authenticity of a document according to an embodiment of the present disclosure. FIG. 2 illustrates example steps performed when the electronic device 10 runs software 28 stored in the memory 14 to train a machine learning model for use in determining the authenticity of a document.

In step S1, the software 28 executed by the processor 12 causes the electronic device 10 to obtain images from a database of images stored in the memory 14. Each of the obtained images is an image of a document, for example, a vaccination card or a laboratory test result. The images may be, for example, scanned images, pictures of paper documents taken with a camera, and a screenshot taken by an electronic device.

Next, in step S2, the software 28 executed by the processor 12 causes the electronic device 10 to extract text content from the document in each image. The text may be extracted, for example, using optical recognition software. In step S3, the software 28 executed by the processor 12 causes the electronic device 10 to divide the obtained images into subsets based on the similarity of the text content of the documents. The text content may be, for example, the name of an entity conducting a test for a pathogen or phrases that appear on all documents issued by a single testing entity. Thus, each subset may include images of documents prepared by a respective testing entity only.

After dividing the obtained images into subsets, in step S4, the software 28 executed by the processor 12 causes the electronic device 10 to assign a same subset label to each document image included in a particular subset. The labels may be alphanumeric, all letters, or all numbers. It is contemplated by the present disclosure that the subsets may be labelled in any manner. For example, each image document including the text "Fairfax County Hospital" may be assigned a same number, for example, seven hundred three (703), and each document image including the text "Wilkes-Bane General Hospital" may be assigned a different number, for example, five hundred seventy (570). Alternatively, for example, the image documents including the text "Fairfax County Hospital" may be designated as the Fairfax County Hospital subset and the document images that include the text "Wilkes-Bane General Hospital" may be designated as the Wilkes-Barre General Hospital subset. The assigned number or designation corresponds to the subset to which the image belongs.

In step S5, the software 28 executed by the processor 12 causes the electronic device 10 to create pairs of images. The images in a pair may be from the same or different subset. For example, one pair may include one image from subset number seven hundred three (703) and another image from subset number five hundred seventy (570). Another pair may include two images from subset number seven hundred three (703) and yet another pair may include a pair of images from subset number five hundred seventy (570).

In step S6, the pairs of images are used to train a machine learning model that can encode images into a LD vector. LD vectors enable determining the similarity in appearance between two images. The LD vector of one image can be compared against the LD vector of other images. For each comparison, a difference in the low dimensionality vectors can be calculated. The difference between the LD vectors is a measure of the similarity in appearance of the images being compared. The smaller the difference between LD vectors, the greater the similarity in visual appearance between the two images being compared. The greater the difference between LD vectors, the smaller the similarity in visual appearance between the two images being compared. The difference between the LD vectors is the distance between the vectors. The difference, or distance, between the LD vectors of two different images can be computed as a Euclidian distance, a cosine distance, or any other type of distance that facilitates calculating the similarity between images as described herein.

After the machine learning model is trained, in step S7, the trained machine learning model encodes each obtained image into a LD vector.

The trained machine learning model may be a Siamese Neural Network. Alternatively, the trained machine learning model may be any other machine learning model capable of mapping an image into a LD vector and determining the similarity or dissimilarity of images based the distance between the vectors associated with the images. Specifically, that two images are similar when the LD vectors associated with the images have a small distance between them and are dissimilar when the LD vectors associated with the images have a large distance between them. The large and small distances vary depending on the images used, the number of errors allowed during training, the length of the LD vectors, and the method of calculating the distances.

Using the method and algorithm for training a machine learning model for use determining the authenticity of a document enables quickly determining whether or not a received image contains an image of an authentic document.

Figure 3:
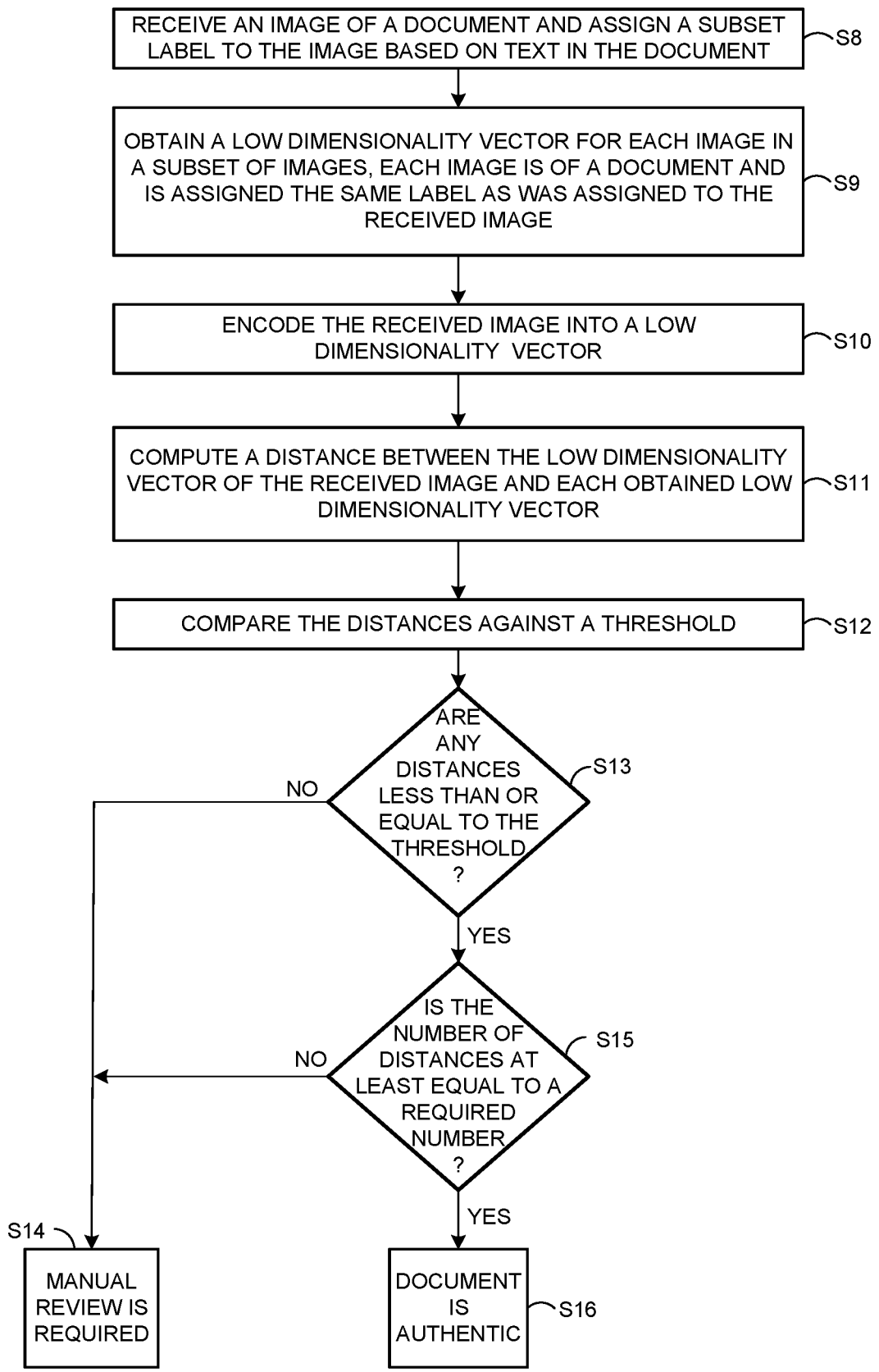
FIG. 3 is a flowchart illustrating an example method and algorithm for determining authenticity of a document according to an embodiment of the present disclosure.

FIG. 3 is a flowchart illustrating an example method and algorithm for determining the authenticity of a document according to an embodiment of the present disclosure. FIG. 3 illustrates example steps performed when the electronic device 10 runs software 28 stored in the memory 14 to determine the authenticity of a document.

In step S8, the software 28 executed by the processor 12 causes the electronic device 10 to receive an image of a document and assign a subset label to the image based on the text in the document. The image may be of, for example, a traveler's vaccination card or an antigen/PCR negative laboratory test result. The image can be uploaded via the Internet by a traveler as part of making a travel related reservation, for example, a reservation for an airline flight. In step S9, the software 28 executed by the processor 12 causes the electronic device 10 to obtain the LD vector for each image in a subset. Each image in the subset is an image of a document for which a LD vector has been calculated. Additionally, each image in the subset has been assigned the same label as was assigned to the received image.

In step S10, the software 28 executed by the processor 12 encodes the received image into a LD vector. The encoding may be performed by the trained machine learning model. The LD vector enables determining the similarity in appearance between the received image and the images in the subset. Next, in step S11, the software 28 executed by the processor 12 causes the electronic device 10 to calculate the difference between the LD vector of the received image and each obtained LD vector. The difference is the distance between the vectors. The greater the difference between LD vectors, the smaller the similarity in visual appearance between the two images being compared. The smaller the distance between LD vectors, the greater the similarity in visual appearance between images. Thus, the images in the subset associated with the LD vectors used to calculate the smaller distances are the most similar to the received image. The image in the subset associated with the LD vector used to calculate the smallest distance is considered to be most similar to the received image.

In step S12, the software 28 executed by the processor 12 causes the electronic device 10 to compare each calculated distance against a threshold distance. In step S13, the software 28 executed by the processor 12 causes the electronic device 10 to determine whether or not any of the calculated distances is less than or equal to the threshold. If not, in step S14, the software 28 executed by the processor 12 causes the electronic device 10 to conclude that manual review of the received image is required to determine whether or not the document in the received image is authentic.

Otherwise, when at least one calculated distance is less than or equal to the threshold, in step S15, the software 28 executed by the processor 12 causes the electronic device 10 to calculate the number of distances that are less than or equal to the threshold and compare the calculated number against a required number. If the calculated number of distances is at least equal to the required number, in step S16, the software 28 executed by the processor 12 causes the electronic device 10 to determine the document in the received image is authentic. However, if the calculated number of distances is less than the required number, in step S14, the software 28 executed by the processor 12 causes the electronic device 10 to conclude that manual review of the document in the received image is required to determine whether or not the document is authentic.

Using the method and algorithm for determining the authenticity of a document described herein facilitates quickly determining whether or not a received image contains an image of an authentic document. As a result, the method and algorithm facilitate increasing the speed, efficiency, and scalability of document review while reducing costs and enhancing customer convenience and satisfaction.

The example methods and algorithms described herein may be conducted entirely by the electronic device 10, partly by the electronic device 10 and partly by any other server (not shown), electronic device (not shown), or computer (not shown) operable to communicate with the electronic device 10 via a network (not shown). It is contemplated by the present disclosure that the example methods and algorithms described herein may be conducted using any combination of computers (not shown), computer systems (not shown), electronic device (not shown), and electronic devices (not shown). Furthermore, data described herein as being stored in the electronic device 10 may alternatively, or additionally, be stored in any other server (not shown), electronic device (not shown), or computer (not shown) operable to communicate with the electronic device 10 via a network.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for determining authenticity of a document comprising the steps of:
   storing images of authentic documents in an image database as subsets of images defined based on the similarity of text content between the images;
   receiving, by an electronic device, an image of a document;
   assigning a label to the received image;
   obtaining a low dimensionality vector for each image in one of the subsets, wherein each image in the one subset is encoded into the respective low dimensionality vector using a trained machine learning modelis and is assigned the same label as the received image;
   encoding the received image into a low dimensionality vector;
   calculating a distance between the low dimensionality vector of the received image and each obtained low dimensionality vector, each distance represents the similarity in appearance between the received image and a respective image in the one subset, wherein the smaller the distance the greater the similarity between the images;
   comparing each of the calculated distances against a threshold distance;
   calculating a number of the calculated distances that are less than or equal to the threshold distance;
   in response to determining the calculated number is at least equal to a required number, determining the document in the received image is authentic; and
   in response to determining the calculated number is less than the required number, determining the received image requires manual review.

2. The method according to claim 1 further comprising the step of determining the label for each image based on the text of the document included in the respective image.

3. The method according to claim 1, said step of determining the received image requires manual review further comprising determining the document in the received image is not similar in content and appearance as the document in any image in the database.

4. The method according to claim 1, said step of determining the document in the received image is authentic further comprising determining the document in the received image is similar in content and appearance as the document in a required number of images in the database.

5. The method according to claim 1, further comprising training a machine learning model to encode an image of a document into a low dimensionality vector.

6. An electronic device for determining authenticity of a document comprising:
   a processor; and
   a memory configured to store data, said electronic device being associated with a network and said memory being in communication with said processor and having instructions stored thereon which, when read and executed by said processor, cause said electronic device to:
   store images of authentic documents in an image database as subsets of images defined based on the similarity of text content between the images;
   receive an image of a document;
   assign a label to the received image;
   obtain a low dimensionality vector for each image in one of the subsets, wherein each image in the one subset is encoded into the respective low dimensionality vector using a trained machine learning model and is assigned the same label as the received image;
   encode the received image into a low dimensionality vector;
   calculate a distance between the low dimensionality vector of the received image and each obtained low dimensionality vector, each distance represents the similarity in appearance between the received image and a respective image in the one subset, wherein the smaller the distance the greater the similarity between the images;
   compare each of the calculated distances against a threshold distance;
   calculate a number of the calculated distances that are less than or equal to the threshold distance;
   in response to determining the calculated number is at least equal to a required number, determining the document in the received image is authentic; and
   in response to determining the calculated number is less than the required number, determining the received image requires manual review.

7. The electronic device according to claim 6, wherein the instructions when read and executed by said processor, cause said electronic device to determine the label for each image based on the text of the document included in the respective image.

8. The electronic device according to claim 6, wherein the instructions when read and executed by said processor, cause said electronic device to determine the document in the received image is not similar in content and appearance as the document in any image in the database when manual review is required.

9. The electronic device according to claim 6, wherein the instructions when read and executed by said processor, cause said electronic device to determine the document in the received image is similar in content and appearance as the document in a required number of images in the database when the document in the received image is determined to be authentic.

10. The electronic device according to claim 6, wherein the instructions when read and executed by said processor, cause said electronic device to train a machine learning model to encode an image of a document into a low dimensionality vector.

11. A non-transitory computer-readable recording medium in an electronic device for determining authenticity of a document, the non-transitory computer-readable recording medium storing instructions which when executed by a hardware processor cause the non-transitory recording medium to perform steps comprising:
  storing images of authentic documents in an image database as subsets of images defined based on the similarity of text content between the images;
  receiving an image of a document;
  assigning a label to the received image;
  obtaining a low dimensionality vector for each image in one of the subsets, wherein each image in the one subset is encoded into the respective low dimensionality vector using a trained machine learning model and is assigned the same label as the received image;
  encoding the received image into a low dimensionality vector;
  calculating a distance between the low dimensionality vector of the received image and each obtained low dimensionality vector, each distance represents the similarity in appearance between the received image and a respective image in the one subset, wherein the smaller the distance the greater the similarity between the images;
  comparing each of the calculated distances against a threshold distance;
  calculating a number of the calculated distances that are less than or equal to the threshold distance;
  in response to determining the calculated number is at least equal to a required number, determining the document in the received image is authentic; and
  in response to determining the calculated number is less than the required number, determining the received image requires manual review.

12. The non-transitory computer-readable recording medium according to claim 11, wherein the instructions when read and executed by said processor, cause said non-transitory computer-readable recording medium to perform a step of determining the label for each image based on the text of the document included in the respective image.

13. The non-transitory computer-readable recording medium according to claim 11, wherein the instructions when read and executed by said processor, cause said non-transitory computer-readable recording medium to perform a step of determining the document in the received image is not similar in content and appearance as the document in any image in the database when the received image requires manual review.

14. The non-transitory computer-readable recording medium according to claim 11, wherein the instructions when read and executed by said processor, cause said non-transitory computer-readable recording medium to perform a step of determining the document in the received image is similar in content and appearance as the document in a required number of images in the database when the received image is determined to be authentic.

15. The non-transitory computer-readable recording medium according to claim 11, wherein the instructions when read and executed by said processor, cause said non-transitory computer-readable recording medium to train a machine learning model to encode an image of a document into a low dimensionality vector.

* * * * *